(12) United States Patent
Minoike et al.

(10) Patent No.: US 11,371,276 B2
(45) Date of Patent: Jun. 28, 2022

(54) AUTOMATIC DOOR SYSTEM

(71) Applicant: OPTEX Co., Ltd., Shiga (JP)

(72) Inventors: Taro Minoike, Shiga (JP); Kousuke Irie, Shiga (JP); Masayuki Fujiwara, Shiga (JP); Akihiro Ikeuchi, Shiga (JP); Takayasu Ikeda, Shiga (JP); Yoshikazu Takashima, Shiga (JP)

(73) Assignee: Optex Co., Ltd., Shiga (JP)

( * ) Notice: Subject to any disclaimer, the term of this patent is extended or adjusted under 35 U.S.C. 154(b) by 196 days.

(21) Appl. No.: 16/647,890

(22) PCT Filed: Aug. 29, 2018

(86) PCT No.: PCT/JP2018/031921
§ 371 (c)(1),
(2) Date: Mar. 17, 2020

(87) PCT Pub. No.: WO2019/058907
PCT Pub. Date: Mar. 28, 2019

(65) Prior Publication Data
US 2020/0217123 A1 Jul. 9, 2020

(30) Foreign Application Priority Data

Sep. 22, 2017 (JP) .............................. JP2017-182917

(51) Int. Cl.
*G06Q 30/02* (2012.01)
*E05F 15/73* (2015.01)
(Continued)

(52) U.S. Cl.
CPC .............. *E05F 15/73* (2015.01); *E05F 15/77* (2015.01); *G06Q 30/02* (2013.01);
(Continued)

(58) Field of Classification Search
CPC ... G07C 9/10; G07C 9/20; G07C 9/28; G07C 9/00309; G06Q 30/0251; G06Q 30/0259;
(Continued)

(56) References Cited

U.S. PATENT DOCUMENTS 4,864,136 A * 9/1989 Behlke ................. G08B 13/191
250/338.3
8,676,273 B1 * 3/2014 Fujisaki ................. H04M 3/533
455/567
(Continued)

FOREIGN PATENT DOCUMENTS

| JP | 09-256736 | 9/1997 |
| JP | 2003-242229 A | 8/2003 |

OTHER PUBLICATIONS

"What is iBeacon?," retrieved from <URL: http://smartphone-ec.net/ibeacon/system.html>, Sep. 11, 2017.
(Continued)

*Primary Examiner* — Daniel I Walsh
(74) *Attorney, Agent, or Firm* — McCarter & English, LLP; David G. Conlin

(57) ABSTRACT

An automatic door system is configured to allow a signal to unfailingly reach a smartphone or the like carried by a customer in various places. The automatic door system includes a BLE module configured such that, in a predetermined direction from a surface of a door, a signal that contains information based on which the BLE module can be identified transmitted from the BLE module reaches an area beyond a person sensing area covered by a sensor.

6 Claims, 4 Drawing Sheets

(51) Int. Cl.
  *E05F 15/77* (2015.01)
  *G07C 9/28* (2020.01)
  *G07C 9/20* (2020.01)
  *G07C 9/00* (2020.01)

(52) U.S. Cl.
  CPC ..... *G06Q 30/0231* (2013.01); *G06Q 30/0259* (2013.01); *G06Q 30/0261* (2013.01); *G06Q 30/0264* (2013.01); *G06Q 30/0272* (2013.01); *G07C 9/00309* (2013.01); *G07C 9/20* (2020.01); *G07C 9/28* (2020.01); *E05Y 2900/132* (2013.01); *G06Q 30/0251* (2013.01); *G07C 2009/00388* (2013.01); *G07C 2009/00507* (2013.01)

(58) Field of Classification Search
  CPC ........... G06Q 30/0261; G06Q 30/0264; G06Q 30/02727; G06Q 30/02; G06Q 30/0231; G06Q 30/0207
  See application file for complete search history.

(56) References Cited

U.S. PATENT DOCUMENTS

| | | | | |
|---|---|---|---|---|
| 2002/0118113 A1* | 8/2002 | Oku | .................... | G08B 13/181 340/573.1 |
| 2002/0175827 A1* | 11/2002 | Klein | .................... | G08C 17/02 340/4.11 |
| 2003/0208386 A1* | 11/2003 | Brondrup | ........... | G07C 9/00904 705/5 |
| 2004/0016562 A1* | 1/2004 | Aoki | .................. | B60R 16/0215 174/68.1 |
| 2004/0049319 A1* | 3/2004 | Kanki | ................ | G05B 23/0272 700/275 |
| 2010/0241496 A1* | 9/2010 | Gupta | .................... | H04L 67/20 705/14.1 |
| 2012/0310741 A1* | 12/2012 | Uyeki | ................ | G06Q 30/0211 705/14.58 |
| 2013/0156433 A1* | 6/2013 | Blair | .................... | H04B 10/00 398/106 |
| 2013/0173372 A1* | 7/2013 | Misra | .................. | G06K 7/1408 705/14.23 |
| 2013/0214099 A1* | 8/2013 | Okumura | ................ | F16L 3/015 248/74.3 |
| 2014/0049361 A1* | 2/2014 | Ahearn | .................... | G07C 9/28 340/5.7 |
| 2015/0339871 A1* | 11/2015 | Wagner | .................... | G07C 9/20 340/5.81 |
| 2017/0295227 A1* | 10/2017 | Arana | .................... | H04W 4/025 |
| 2018/0112452 A1* | 4/2018 | Kimura | .................... | E05B 81/70 |
| 2019/0003239 A1* | 1/2019 | Zhu | ........................ | E05F 1/006 |
| 2019/0236868 A1* | 8/2019 | Rines | ........................ | G07C 9/28 |
| 2019/0277078 A1* | 9/2019 | Baruco | ................ | E05F 15/686 |
| 2020/0150915 A1* | 5/2020 | Brown | .................. | G06F 3/1446 |
| 2020/0217123 A1* | 7/2020 | Minoike | ................ | E05F 15/76 |
| 2020/0304977 A1* | 9/2020 | Sylwander | ......... | G06Q 30/0268 |
| 2021/0034882 A1* | 2/2021 | Johnson | ............. | G07C 9/00309 |
| 2021/0044861 A1* | 2/2021 | Fang | .................. | G07C 9/00309 |
| 2021/0110356 A1* | 4/2021 | Hamakubo | ............ | G06N 5/046 |
| 2021/0140221 A1* | 5/2021 | Dreyer | .................... | E05F 15/43 |
| 2021/0214970 A1* | 7/2021 | Yang | .................. | G07C 9/00309 |
| 2021/0355739 A1* | 11/2021 | Tulsidas | ................ | E05F 15/624 |
| 2021/0393131 A1* | 12/2021 | Kawajiri | ................ | G01R 33/288 |
| 2022/0039581 A1* | 2/2022 | Lee | .......................... | E06B 7/32 |

OTHER PUBLICATIONS

International Search Report dated Nov. 27, 2018 in corresponding International Patent Application No. PCT/JP2018/031921.

International Preliminary Report on Patentability dated Mar. 24, 2020 in corresponding International Patent Application No. PCT/JP2018/031921.

* cited by examiner

AUTOMATIC DOOR SYSTEM

TECHNICAL FIELD

The present invention relates to an automatic door system that includes a communication section capable of near field communication.

BACKGROUND ART

Recently, attention has been focused on an advertisement delivery system in which a beacon signal is transmitted via Bluetooth Low Energy (BLE) and information such as an advertisement or coupon is push notified. BLE consumes much less electric power than Bluetooth (registered trademark), and can run on a coin cell, button cell, or the like for a long period of time.

For example, Non-patent Literature 1 discloses a coupon ticketing system using BLE. According to the system disclosed in Non-patent Literature 1, a beacon transmitter that is capable of communication via BLE is installed at a store, and a smartphone that is capable of communication via BLE receives a BLE advertising signal transmitted from the beacon transmitter. The smartphone then sends ID information contained in the BLE advertising signal to a server, and acquires a coupon relating to the store from the server.

CITATION LIST

Non-Patent Literature

[Non-patent Literature 1]
"iBeacon toha?" ("What is iBeacon?") [Online] [Searched on Sep. 11, 2017], Internet <URL: http://smartphone-ec.net/ibeacon/system.html>

SUMMARY OF INVENTION

Technical Problem

According to the coupon ticketing system of the above-described conventional technique, the beacon transmitter is simply installed in a store. Therefore, depending on the location of the beacon transmitter, the signal (beacon signal) transmitted from the beacon transmitter may not successfully reach a customer's smartphone. This is because the customer does not always pass by the beacon transmitter.

Many stores have an automatic door. The automatic door is a place where customers necessarily pass through. A combination of an automatic door and a beacon transmitter would be able to improve the foregoing coupon ticketing system.

Furthermore, automatic doors are installed not only in stores but also in various places. Therefore, a combination of an automatic door and a beacon transmitter will provide, in various places, a system that is capable of sending a beacon signal unfailingly to a smartphone or the like carried by a customer.

An aspect of the present invention has a focus on a combination of the foregoing automatic door and beacon transmitter, and an object thereof is to provide, in various places, an automatic door system that is capable of sending a beacon signal unfailingly to a smartphone or the like carried by a customer.

Solution to Problem

In order to attain the above object, an automatic door system in accordance with an aspect of the present invention includes: a sensor; a door; and a transmitter, the sensor being configured to sense a person who is about to pass through the door, the door being configured to open and close in accordance with a result of sensing by the sensor, the transmitter being configured such that, in a predetermined direction from a surface of the door on at least one side of the door, a signal transmitted from the transmitter reaches an area beyond a person sensing area covered by the sensor, the signal containing identification information indicative of the transmitter.

Advantageous Effects of Invention

According to an aspect of the present invention, it is possible to allow a signal to reach a mobile data terminal carried by a person, before a sensor senses the person and a door opens. This makes it possible to prevent or reduce the likelihood that the person will have passed through the door before the signal reaches the mobile data terminal carried by the person, and thus possible to increase the probability of success of signal reception by the mobile data terminal. In other words, it is possible to further ensure that the mobile data terminal receives a signal.

DESCRIPTION OF EMBODIMENTS

[Base Configuration of Automatic Door System 10]

Figure 1:
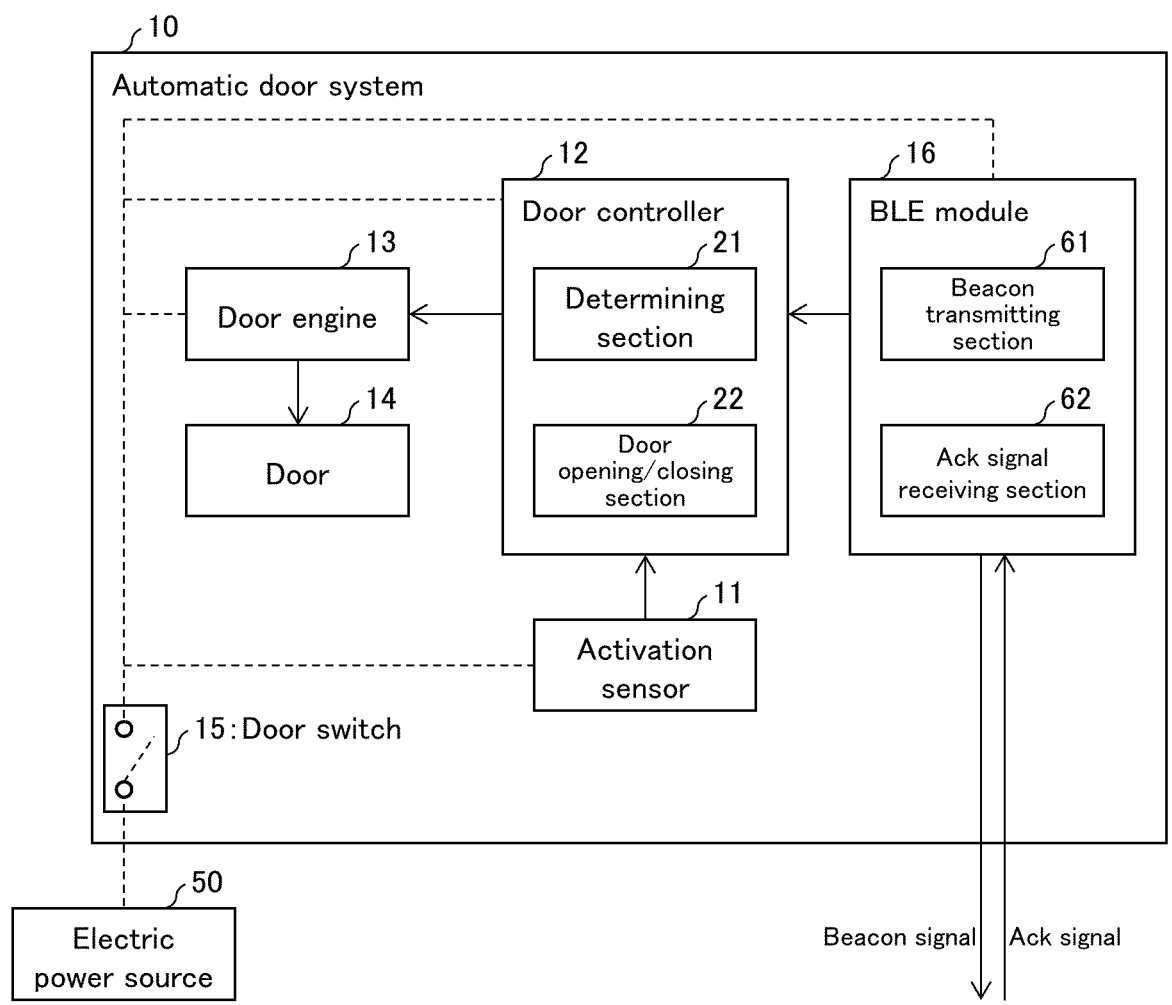
FIG. 1 is a block diagram illustrating a configuration of main parts of an automatic door system in accordance with an embodiment of the present invention.

The following description will discuss an embodiment of the present invention in detail. First, an automatic door system 10 in accordance with the present embodiment is discussed with reference to FIG. 1. FIG. 1 is a block diagram illustrating a configuration of main parts of the automatic door system 10. Note that, although the present embodiment is described based on an example in which an automatic door consists of sliding doors, the automatic door is not limited as such. The automatic door may be some other automatic door such as a tandem sliding door, a revolving door, or the like.

As illustrated in FIG. 1, the automatic door system 10 includes an activation sensor 11, a door controller 12, a door engine 13, a door 14, a door switch 15, and a BLE module (beacon transmitter, receiver) 16. The automatic door system 10 is supplied with electric power from an electric power source 50.

The activation sensor 11 is a sensor to sense, for example, a person who is about to pass through the door (hereinafter may be referred to as "person" for short). When a person or the like enters a sensing area (person sensing area) covered by the activation sensor 11, the activation sensor 11 sends, to the door controller 12, a sensed signal indicating that the person or the like has entered the sensing area. The activation sensor 11 is attached to, for example, a transom or ceiling.

The door controller 12 controls opening/closing of doors 14. More specifically, upon receipt of a sensed signal from the activation sensor 11, a door opening/closing section 22 of the door controller 12 sends, to the door engine 13, an instruction to open the doors 14. Furthermore, after a predetermined period of time has passed from when the sensed signal from the activation sensor 11 stopped reaching the door opening/closing section 22 of the door controller 12, the door opening/closing section 22 sends, to the door engine 13, an instruction to close the doors 14. Note that the function of the door controller 12 may be included in the activation sensor 11.

The door engine 13 is a power unit that opens or closes the doors 14 in accordance with an instruction from the door controller 12. The door engine 13 is comprised of, for example, an electric motor.

The door switch 15 is a switch for switching between a state in which electric power is supplied from the electric power source 50 to the automatic door system 10 and a state in which the electric power is not supplied from the electric power source 50 to the automatic door system 10. Specifically, when the door switch 15 is in ON state, electric power is supplied from the electric power source 50 to the automatic door system 10, whereas, when the door switch 15 is in OFF state, the supply of the electric power from the electric power source 50 to the automatic door system 10 is blocked. In the present embodiment, electric power from the electric power source 50 is supplied to various sections (activation sensor 11, door controller 12, door engine 13, and BLE module 16) of the automatic door system 10 via the door switch 15. Therefore, in a case where the door switch 15 is turned OFF, i.e., in a case where the electric power source for the automatic door system 10 is turned OFF, the supply of electric power to the BLE module 16 is also blocked. This makes it possible to prevent the likelihood that the BLE module 16 will transmit a beacon signal even when the electric power source for the automatic door system 10 is OFF. For the BLE module 16 to transmit a beacon signal even when the electric power source for the automatic door system 10 is OFF, it is only necessary to employ an arrangement in which the electric power source 50 and the BLE module 16 are directly connected together without the door switch 15 interposed between them.

Note that the BLE module 16 may receive electric power via the activation sensor 11, the door controller 12, and/or the door engine 13, instead of receiving electric power directly from the door switch 15. Additionally or alternatively, the BLE module 16 may receive electric power via some other member included in the automatic door system 10.

Additionally or alternatively, the automatic door system 10 may be arranged such that it can be selectively placed in the following states: (i) a state in which supply of electric power to the BLE module 16 is carried out in conjunction with the door switch 15; and (ii) a state in which supply of electric power to the BLE module 16 is carried out not in conjunction with the door switch 15.

The BLE module 16 serves to send a signal or the like via Bluetooth Low Energy (BLE), and includes a beacon transmitting section 61 and an ACK signal receiving section 62. The beacon transmitting section 61 transmits a beacon signal periodically at predetermined intervals. The beacon signal contains ID information (identification information). With use of the ID information, it is possible to determine an attribute of a place where the automatic door system 10 is present. The attribute of a place where the automatic door system 10 is present contains, for example, a geographical area (e.g., town, city, prefecture) or a geographical region (e.g., XX region) where the automatic door system 10 is present, the name, type, attribute, and/or the like of a store where the automatic door system 10 is present, and/or the like. Specifically, the ID information can be considered containing information indicative of the attribute of the place where the BLE module 16 is present.

The ACK signal receiving section 62 receives an acknowledgment signal (ACK signal) sent by a response terminal in response to the beacon signal transmitted by the beacon transmitting section 61.

[Sensing Area Covered by Activation Sensor 11, and Range Reachable by Beacon Signal from BLE Module 16]

Figure 2:
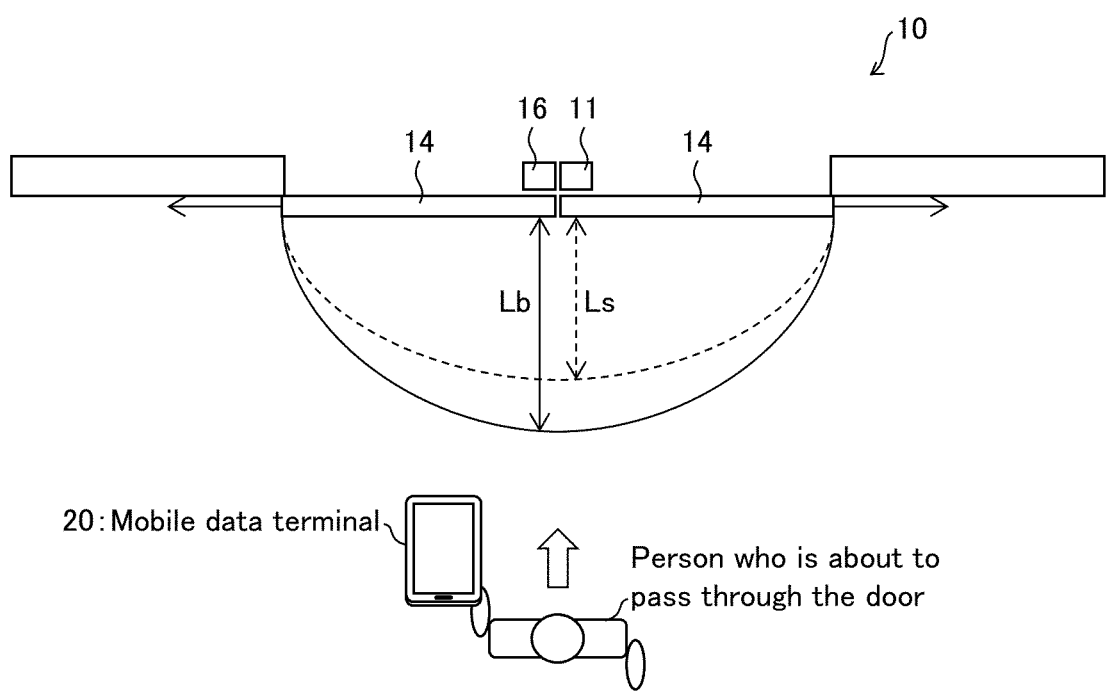
FIG. 2 illustrates a comparison between a sensing area covered by an activation sensor and an area reachable by a beacon signal sent from a BLE module, in the automatic door system.

FIG. 2 illustrates a relationship between the sensing area covered by the activation sensor 11 and the distances reachable by a beacon signal sent from the BLE module 16. FIG. 2 is a top view of the automatic door system 10, and shows an example in which the doors 14 are configured to slide open and in which the activation sensor 11 and the BLE module 16 are provided near the center of the doors 14.

In the present embodiment, the BLE module 16 is configured such that, in a predetermined direction from a surface of the doors 14 on at least one side of the doors 14, a beacon signal transmitted from the BLE module 16 reaches an area beyond the person sensing area covered by the activation sensor 11. The "predetermined direction" may be any direction, and may be, for example, a direction in which the person travels or a direction normal to the center of the surface of the doors. A case where the predetermined direction is a direction normal to the center of the surface of the doors (hereinafter may be referred to as "normal direction") is discussed below with reference to FIG. 2.

In FIG. 2, the sensing area covered by the activation sensor 11 is outlined by dashed line. As illustrated in FIG. 2, the sensing area covered by the activation sensor 11 is a circle centered on the activation sensor 11 (only a portion on one side of the doors is shown in FIG. 2). A distance from the center of the doors 14 in the normal direction is indicated by "Ls". Furthermore, in FIG. 2, the range reachable by a beacon signal from the BLE module 16 is outlined by solid line. As illustrated in FIG. 2, the range reachable by a beacon signal from the BLE module 16 is a circle centered on the BLE module 16 (only a portion on one side of the doors is shown in FIG. 2). A distance from the center of the doors in the normal direction is indicated by "Lb".

As illustrated in FIG. 2, in the present embodiment, the range reachable by a beacon signal sent from the BLE module 16 is broader than the sensing area covered by the activation sensor 11 (i.e., Ls<Lb). In other words, the beacon transmitting section 61 of the BLE module 16 is configured such that a beacon signal transmitted therefrom reaches an area beyond the sensing area covered by the activation sensor 11, in a direction normal to the center of the doors 14. In other words, the range reachable by a beacon signal sent from the BLE module 16 contains therein the entire sensing area covered by the activation sensor 11.

With this, as a person approaches the automatic door system 10, a mobile data terminal 20 carried by the person enters the range reachable by a beacon signal sent from the BLE module 16, before the mobile data terminal 20 enters the sensing area covered by the activation sensor 11. This makes it possible to allow the beacon signal to reach the mobile data terminal 20 carried by the person before the activation sensor 11 senses the person and the doors 14 open, and thus possible to allow the beacon signal to unfailingly reach the mobile data terminal 20.

If the range reachable by a beacon signal sent from the BLE module 16 is smaller than the sensing area covered by the activation sensor 11, the doors 14 may open and the person may pass through the automatic door system 10 before the beacon signal is sent. According to the present embodiment, as described earlier, it is possible to prevent such an instance and send the beacon signal unfailingly to the mobile data terminal 20.

Note that the "direction normal to the center of the surface of the door(s)" refers to a direction of a normal line that passes through the center of an opening that appears when the door(s) opens. This normal line is one of the lines normal to the surface of the door(s) in closed state. Also note that, when discussing about a beacon signal reaching something in this specification, the discussion is based on the assumption that the beacon signal reaches that something in a situation where no obstacles, such as persons, are present.

[Combination with ACK Signal]

The following arrangement may be employed: the door controller 12 determines, in accordance with a sensed signal from the activation sensor 11 and a receipt acknowledgement signal from the BLE module 16, whether or not to send an instruction to open the doors 14. The receipt acknowledgement signal is a signal indicating that the BLE module 16 has received an ACK signal, and is sent from the BLE module 16 to the door controller 12.

More specifically, in a case where a control is carried out to open the doors 14 with use of a combination of a sensed signal and an ACK signal, the ACK signal receiving section 62 of the BLE module 16, upon receipt of the ACK signal, sends a receipt acknowledgement signal (indicating that the ACK signal receiving section 62 has received the ACK signal) to the door controller 12.

A determining section 21 of the door controller 12 determines whether or not both the sensed signal from the activation sensor 11 and the receipt acknowledgement signal from the BLE module 16 have been received. If it is determined that both signals have been received, the determining section 21 notifies the door opening/closing section 22 that both signals have been received. The door opening/closing section 22, upon receipt of the notification, sends, to the door engine 13, an instruction to open the doors 14.

With this arrangement, the doors 14 will not open until a beacon signal is sent to the mobile data terminal 20 and the BLE module 16 receives an ACK signal from the mobile data terminal 20. This makes it possible to allow the beacon signal to unfailingly reach the mobile data terminal 20 carried by the person.

Note that the following arrangement may be employed: in a case where the sensed signal from the activation sensor 11 has been received but the ACK signal has not been received, the doors 14 are opened after a predetermined period of time. With this arrangement, the doors 14 open after some delay, and the person stays near the automatic door system 10 for a longer period of time. This makes it possible to increase the likelihood that the beacon signal from the BLE module 16 will reach the mobile data terminal 20.

Note that the following arrangement may be employed: the mobile data terminal 20 sends, to the automatic door system 10, not only the ACK signal but also identification information indicative of the mobile data terminal 20. The automatic door system 10 receives the identification information from the mobile data terminal 20, and is thereby capable of controlling opening/closing of the doors 14 in accordance with the identification information. For example, an arrangement in which the doors 14 are opened only when specific identification information is received is employed. This makes it possible to use the identification information as a key to opening the doors 14.

[Flow of Process Carried Out by Automatic Door System 10]

Figure 3:
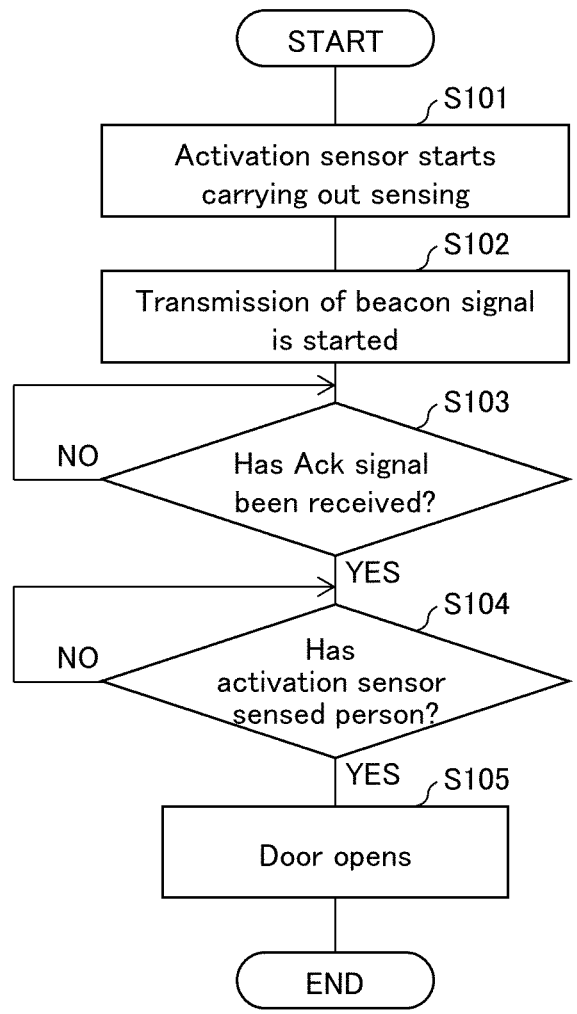
FIG. 3 is a flowchart showing a flow of a process of opening doors using a combination of a sensed signal and an ACK signal, in the automatic door system.

The following description will discuss, with reference to FIG. 3, a process flow in a case where the automatic door system 10 carries out a process of opening the doors 14 with use of a combination of a sensed signal and an ACK signal (acknowledgment signal). FIG. 3 is a flowchart showing a flow of a process of opening the doors 14 with use of a combination of a sensed signal and an ACK signal.

As shown in FIG. 3, in a case where a process of opening the doors 14 is carried out by the automatic door system 10, the activation sensor 11 first starts carrying out sensing (S101). Next, the beacon transmitting section 61 of the BLE module 16 starts sending a beacon signal (S102). As described earlier, the beacon signal is sent periodically at predetermined intervals. Next, the determining section 21 of the door controller 12 determines whether or not a receipt acknowledgement signal, indicating that the ACK signal receiving section 62 has received an ACK signal, has been received (S103). If it is determined that the receipt acknowledgement signal has been received (YES in S103), the determining section 21 determines whether or not a sensed signal has been received from the activation sensor 11 (S104). If it is determined that the sensed signal has been received (YES in S104), the door opening/closing section 22 instructs the door engine 13 to open the doors 14 (S105).

Note that steps S103 and S104 may be carried out in reverse order or may be carried out concurrently.

[Advertisement Delivery System]

Figure 4:
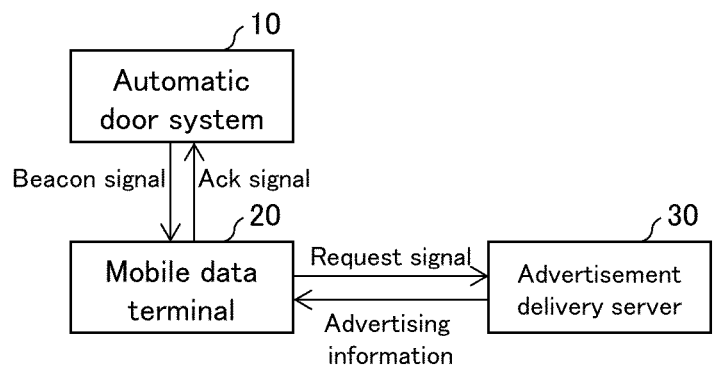
FIG. 4 shows an overview of an advertisement delivery system that includes the automatic door system.
Figure 5:
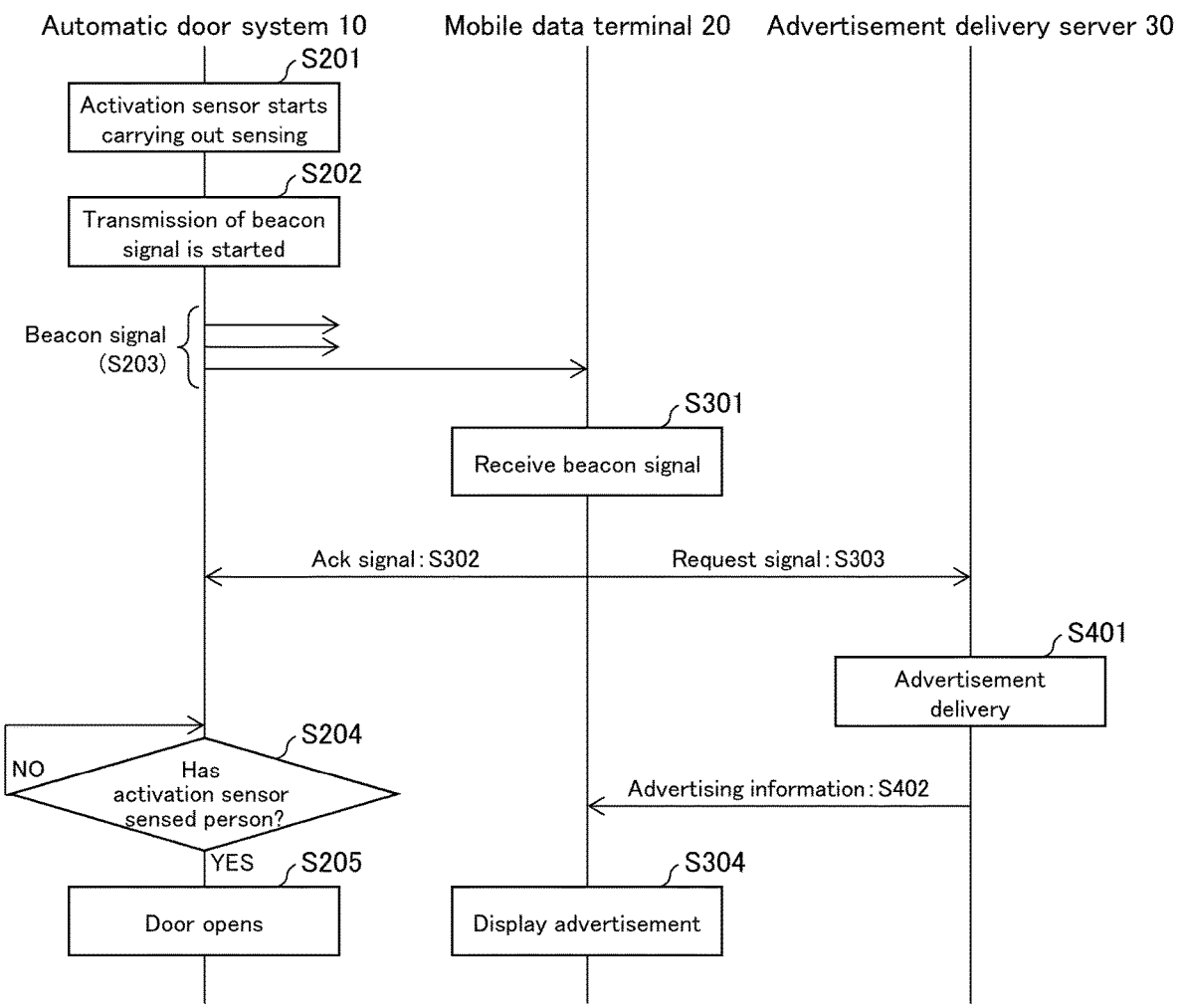
FIG. 5 is a sequence diagram showing a flow of a process carried out by the advertisement delivery system.

The following description will discuss, with reference to FIGS. 4 and 5, an advertisement delivery system that includes the foregoing automatic door system 10. First, an overview of this configuration is illustrated in FIG. 4. As illustrated in FIG. 4, the advertisement delivery system includes the automatic door system 10, the mobile data terminal 20, and an advertisement delivery server 30.

The mobile data terminal 20, upon receipt of a beacon signal from the automatic door system 10, sends information (request signal) indicated by the beacon signal to the advertisement delivery server 30. The advertisement delivery server 30, upon receipt of the request signal from the mobile data terminal 20, sends advertising information corresponding to the request signal to the mobile data terminal 20.

The following description will discuss, with reference to FIG. 5, a flow of a process carried out by the advertisement delivery system. FIG. 5 is a sequence diagram showing a flow of a process carried out by the advertisement delivery system.

As shown in FIG. 5, in the advertisement delivery system, first, the activation sensor 11 of the automatic door system 10 starts carrying out sensing (S201), and the BLE module 16 starts sending a beacon signal (S202). The beacon signal is sent periodically at predetermined intervals (S203). Next, the mobile data terminal 20 receives the beacon signal (S301), and then the mobile data terminal 20 sends an ACK signal to the automatic door system 10 (S302) and sends information (request signal) contained in the beacon signal to the advertisement delivery server 30 (S303).

Upon receipt of the request signal, the advertisement delivery server 30 sends advertising information corresponding to the request signal to the mobile data terminal 20

(S402). The mobile data terminal 20, upon receipt of the advertising information, displays the advertising information (S304).

Upon receipt of the ACK signal, the automatic door system 10 carries out, upon sensing of a person by the activation sensor 11 (YES in S204), an operation to open the doors 14 (S205).

As has been described, according to the advertisement delivery system, advertising information is sent to the mobile data terminal 20 which has received a beacon signal. Furthermore, as described earlier, according to the automatic door system 10, it is possible to allow the beacon signal to unfailingly reach the mobile data terminal 20. Thus, according to the advertisement delivery system, it is possible to send the advertising information unfailingly to the mobile data terminal 20.

[Software Implementation Example]

Control blocks of the automatic door system 10 (particularly, the door controller 12 (the determining section 21 and the door opening/closing section 22)) can be realized by a logic circuit (hardware) provided in an integrated circuit (IC chip) or the like or can be alternatively realized by software.

In the latter case, the automatic door system 10 includes a computer that executes instructions of a program that is software realizing the foregoing functions. The computer, for example, includes at least one processor and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows.

An automatic door system in accordance with an aspect of the present invention includes: a sensor; a door; and a transmitter, the sensor being configured to sense a person who is about to pass through the door, the door being configured to open and close in accordance with a result of sensing by the sensor, the transmitter being configured such that, in a predetermined direction from a surface of the door on at least one side of the door, a signal transmitted from the transmitter reaches an area beyond a person sensing area covered by the sensor, the signal containing identification information indicative of the transmitter.

According to the above arrangement, it is possible to allow a signal to reach a mobile data terminal carried by the person before the sensor senses the person and the door opens. This makes it possible to prevent or reduce the likelihood that the person will have passed through the door before the signal reaches the mobile data terminal carried by the person, and thus possible to increase the probability of success of signal reception by the mobile data terminal. In other words, it is possible to further ensure that the mobile data terminal receives a signal.

Note that the sensor may be an activation sensor, and that the transmitter may be a beacon transmitter and the signal transmitted from the beacon transmitter may be a beacon signal.

Also note that the identification information indicative of the transmitter may contain information indicative of an attribute of a place where the transmitter is present.

An automatic door system in accordance with another aspect of the present invention may be arranged such that the transmitter is configured such that, in a direction normal to a center of the surface of the door on at least one side of the door, the signal transmitted from the transmitter reaches an area beyond the person sensing area covered by the sensor.

The above arrangement makes it possible to achieve the foregoing effect on both sides of the door.

An automatic door system in accordance with a further aspect of the present invention may include: a door controller configured to control opening/closing of the door; and a door engine configured to open and close the door in accordance with control by the door controller, the transmitter being configured to receive electric power from the sensor, the door controller, the door engine, and/or a member included in the automatic door system.

According to the above arrangement, the electric power for the transmitter to operate is supplied from the sensor, the door controller, the door engine, and/or a member included in the automatic door system. This eliminates the need for, for example, battery replacement on the transmitter. It is also possible to simplify the routing of power supply lines.

An automatic door system in accordance with still a further aspect of the present invention may include: a door configured to be driven by electric power and thereby open and close; a switch configured to switch between an ON state and an OFF state, the ON state being a state in which the electric power is supplied to open or close the door, the OFF state being a state in which the electric power is not supplied; and a transmitter configured to transmit a signal when the switch is in the ON state and not to transmit the signal when the switch is in the OFF state, the signal containing identification information indicative of the transmitter.

According to the above arrangement, transmission of the signal can be stopped in a condition in which the door is not supplied with electric power and therefore cannot open and cannot allow a person to pass therethrough. This makes it possible to stop advertising coupons or the like from being push notified when, for example, a store is closed.

An automatic door system in accordance with still a further aspect of the present invention may be arranged such that the transmitter is configured to be selectively placed in a first state and a second state, the first state being a state in which the transmitter transmits the signal when the switch is in the ON state and does not transmit the signal when the switch is in the OFF state, the second state being a state in which the transmitter transmits or does not transmit the signal irrespective of whether the switch is in the ON state or the OFF state.

According to the above arrangement, it is possible to achieve an arrangement in which the transmission of the signal is carried out even in a condition in which the door is not supplied with electric power and therefore cannot open and cannot allow a person to pass therethrough. This makes it possible to meet a demand that advertising coupons or the like be push notified even when, for example, a store is closed.

An automatic door system in accordance with still a further aspect of the present invention may include: a receiver configured to receive an acknowledgment signal that is sent, in response to the signal, by a mobile data terminal which has received the signal; and a door controller configured to control opening/closing of the door in accordance with the acknowledgment signal.

According to the above arrangement, the door is opened only when it is determined that the signal has been received by the mobile data terminal. This makes it possible to cause the mobile data terminal to unfailingly receive the signal.

An automatic door system in accordance with still a further aspect of the present invention may be arranged such that: the receiver is configured to receive identification information indicative of the mobile data terminal; and the door controller is configured to control opening/closing of the door in accordance with the identification information indicative of the mobile data terminal.

According to the above arrangement, opening/closing of the door is controlled in accordance with identification information indicative of a mobile data terminal. This makes it possible, for example, to restrict passage of people based on identification information indicative of mobile data terminals.

REFERENCE SIGNS LIST 10 automatic door system
11 activation sensor
12 door controller
13 door engine
14 door
15 door switch
16 BLE module (beacon transmitter, receiver)
20 mobile data terminal
21 determining section
22 door opening/closing section
30 advertisement delivery server
50 electric power source
61 beacon transmitting section (beacon transmitter)
62 signal receiving section (receiver)

The invention claimed is:
1. An automatic door system comprising:
a door configured to be driven by electric power and thereby open and close;
a switch configured to switch between an ON state and an OFF state, the ON state being a state in which the electric power is supplied to open or close the door, the OFF state being a state in which the electric power is not supplied; and
a transmitter that operates in a first state in which the transmitter is configured to transmit a signal when the switch is in the ON state and not to transmit the signal when the switch is in the OFF state, the signal containing identification information indicative of the transmitter, and
wherein the transmitter is configured to be selectively placed in the first state or a second state, the second state being a state in which the transmitter transmits or does not transmit the signal irrespective of whether the switch is in the ON state or the OFF state.

2. The automatic door system of claim 1, further comprising:
a sensor,
the sensor being configured to sense a person who is about to pass through the door,
the door being configured to open and close in accordance with a result of sensing by the sensor,
the transmitter being configured such that, in a predetermined direction from a surface of the door on at least one side of the door, the signal transmitted from the transmitter reaches an area beyond a person sensing area covered by the sensor, the signal containing identification information indicative of the transmitter.

3. The automatic door system as set forth in claim 2, wherein the transmitter is configured such that, in a direction normal to a center of the surface of the door on at least one side of the door, the signal transmitted from the transmitter reaches an area beyond the person sensing area covered by the sensor.

4. The automatic door system as set forth in claim 2, comprising:
a door controller configured to control opening/closing of the door; and
a door engine configured to open and close the door in accordance with control by the door controller,
the transmitter being configured to receive electric power from the sensor, the door controller, the door engine, and/or a member included in the automatic door system.

5. The automatic door system as set forth in claim 2, comprising:
a receiver configured to receive an acknowledgment signal that is sent, in response to the signal, by a mobile data terminal which has received the signal; and
a door controller configured to control opening/closing of the door in accordance with the acknowledgment signal.

6. The automatic door system as set forth in claim 5, wherein:
the receiver is configured to receive identification information indicative of the mobile data terminal; and
the door controller is configured to control opening/closing of the door in accordance with the identification information indicative of the mobile data terminal.

* * * * *